Patented Jan. 25, 1938

2,106,555

UNITED STATES PATENT OFFICE 2,106,555

MANUFACTURE OF WHITE LEAD

Paul La Frone Magill, Ransomville, N. Y., assignor to E. I. du Pont de Nemours & Company, Wilmington, Del., a corporation of Delaware No Drawing. Application September 14, 1936, Serial No. 100,681

9 Claims. (Cl. 23—72)

The pigment white lead is a basic lead carbonate generally considered to have the formula $2PbCO_3.Pb(OH)_2$. There are several processes for manufacturing this pigment, all of which depend upon reacting pure metallic lead with some reagent or reagents which react with the lead to form the basic carbonate. A widely used method is the so-called "Dutch" process in which perforated lead plates called "buckles" are exposed to the action of moist vapors of carbon dioxide and acetic acid until the "buckles" become coated with a layer of the basic carbonate. The carbonate is then removed from the "buckles" and is purified by washing, grinding and classifying. In this and other methods for producing white lead heretofore proposed, considerable periods of time were required for the reaction between the metallic lead and the reagents used. For example, in the "Dutch" process a period of 90 to 120 days is usually required to produce the desired layer of white lead on the surface of the "buckles." Other processes require somewhat shorter periods of time but still the reaction period is relatively long. For example, in the "Carter" process, (sometimes called the "quick" process) where finely divided lead is reacted with carbon dioxide and acetic acid, the reaction period usually is around twelve days.

The object of the present invention is to provide a new and improved method for manufacturing white lead. A further object is to decrease the time required for reacting metallic lead with a suitable reagent for the production of the basic lead carbonate. Other objects will be apparent from the following discussion of my invention.

The above objects are attained in accordance with the herein described invention by reacting an alkali metal alloy, for example, a sodium lead alloy, with a reagent, or reagents capable of reacting with lead to produce the basic carbonate thereof. Suitable carbonating reagents include those heretofore used for making white lead, for example, the conjoint action of carbon dioxide, water and a weak acid such as acetic acid.

I have found that by adding to lead a relatively small amount of an alkali metal, for example, sodium, the rate of reaction of the lead with basic carbonate forming reagents, such as acetic acid carbon dioxide mixtures is increased many fold, thus greatly decreasing the time required for the reaction.

The amount of alkali metal to be incorporated into the lead may be varied within wide limits without departing from the scope of my invention. It is preferable, however, to restrict the alkali metal content of the lead alloy to such extent that the alloy will not react violently with water. For example, if a lead sodium alloy is used, the sodium content should be below about 33%, it having been found that the alloy will not react violently with water until the sodium content is increased to about one-third of the total weight. However, for practical results it is not necessary to use large quantities of the alkali metal and because of the relatively high cost of such metals, I prefer to use an alloy containing about 0.5 to 1% by weight of the alkali metal. This concentration of the alkali metal increases the rate of the reaction between the lead and the carbonating reagent many fold, as compared with the reaction of pure lead and does not materially increase the cost of the process.

Methods for making alloys of lead and introducing alkali metals are well-known and need not be described in detail here. In making a lead alloy suitable for use in my invention, for example, one containing 1% of sodium, I prefer first to prepare a lead-sodium alloy containing a rather large amount of sodium, usually about 10% and add sufficient of this to a bath of molten lead to produce the desired alloy.

One method of practicing my invention utilizes the technique of the so-called "Dutch" process, an alloy containing substantially pure lead and 0.5 to 1% of sodium is prepared and cast in the form of perforated discs or "buckles" such as commonly are used in the "Dutch" process. These "buckles" are stacked in earthenware pots which contain dilute acetic acid and layers of the pots are then interspersed with layers of tan-bark in an enclosed space in the usual manner. The tan-bark then ferments to produce carbon dioxide and sufficient heat for the process. After the reaction between the lead and the resulting mixture of carbon dioxide and water vapors and acetic acid vapors has proceeded to sufficient extent, the "buckles" are removed and the layer of basic lead carbonate on each "buckle" is recovered by the usual method. In the ensuing purification steps, which may follow that commonly used in the "Dutch" process, I prefer to wash the white lead sufficiently to remove substantially all sodium compounds; e. g., sodium carbonate and sodium acetate which may be present.

In another method of practicing my invention, I may utilize the technique of the "Carter" process. In this method, the sodium lead alloy first is melted and atomized to a finely divided form. Preferably I atomize the molten alloy with a non-oxidizing gas, for example, dry nitrogen, in order to prevent undue oxidation of sodium on the surface of the fine particles of alloy produced. However, if desired, oxidizing or moist gases may be used to atomize the alloy, for example, steam. In such case, some oxidation of the sodium will occur, with the result that the fine particles formed will have corroded surfaces or will be of a somewhat porous nature. Such increase in the surface of the particles thus produced will be of advantage in the succeeding operations. The finely divided metal then is reacted with a solution of acetic acid, through which is passed a current of carbon dioxide, until the greater portion of the lead has been transformed to the basic carbonate. The basic carbonate then is recovered from unreacted metal, purified and graded by known means.

Another adaptation of my invention comprises electrolyzing a bicarbonate solution with anodes made of lead sodium alloy or other alkali metal-lead alloy. The rate of anode corrosion is greatly increased by the presence of metallic sodium and the efficiency of the process is increased.

It is obvious that the herein described invention is not restricted to the specific methods described above; it is suitable for the manufacture of white lead by any process wherein metallic lead is reacted with a suitable aqueous reagent or reagents to form the basic carbonate. The presence of the alkali metal in the lead greatly accelerates the reaction and thus greatly reduces the time and expense required to produce the white lead.

I claim:

1. A process for producing white lead comprising exposing an alkali metal-lead alloy to the action of an aqueous reagent capable of reacting with lead to form the basic carbonate thereof.

2. A process for producing white lead comprising corroding an alkali metal-lead alloy containing not more than about 33% by weight of alkali metal in the presence of carbon dioxide and water.

3. A process for producing white lead comprising exposing an alkali metal-lead alloy containing not more than about 33% by weight of alkali metal to the action of carbon dioxide, water and acetic acid.

4. A process for producing white lead comprising exposing a sodium-lead alloy to the action of an aqueous reagent capable of reacting with lead to form the basic carbonate thereof.

5. A process for producing white lead comprising exposing a sodium-lead alloy containing not more than about 33% by weight of sodium to the action of an aqueous reagent capable of reacting with lead to form the basic carbonate thereof, thereafter recovering the resulting basic lead carbonate and washing said carbonate to remove sodium compounds therefrom.

6. A process for producing white lead comprising exposing a sodium-lead alloy containing about 0.5 to 1% by weight of sodium to the action of an aqueous reagent capable of reacting with lead to form the basic carbonate thereof, thereafter recovering the resulting basic lead carbonate and washing said carbonate to remove sodium compounds therefrom.

7. A process for producing white lead comprising corroding a sodium-lead alloy containing about 0.5 to 1% by weight of sodium in the presence of carbon dioxide and water, thereafter recovering the resulting basic lead carbonate and washing said carbonate to remove sodium compounds therefrom.

8. A process for producing white lead comprising exposing a sodium-lead alloy containing about 0.5 to 1% by weight of sodium to the action of carbon dioxide, water and a weak acid, thereafter recovering the resulting basic lead carbonate and washing said carbonate to remove sodium compounds therefrom.

9. A process for producing white lead comprising exposing a sodium-lead alloy containing about 0.5 to 1% by weight of sodium to the action of carbon dioxide, water and acetic acid, thereafter recovering the resulting basic lead carbonate and washing said carbonate to remove sodium compounds therefrom.

PAUL LA FRONE MAGILL.